United States Patent [19]

Harrison

[11] 3,911,102

[45] Oct. 7, 1975

[54] DENTIFRICES

[75] Inventor: Michael Harrison, Newcastle-upon-Tyne, England

[73] Assignee: Colgate-Palmolive Company, New York, N.Y.

[22] Filed: Sept. 16, 1974

[21] Appl. No.: 506,670

Related U.S. Application Data

[63] Continuation of Ser. No. 182,142, Sept. 20, 1971, abandoned.

[30] Foreign Application Priority Data

Sept. 21, 1970 United Kingdom............... 44858/70

Nov. 27, 1970 United Kingdom............... 56577/70

[52] U.S. Cl. ............................................. 424/49
[51] Int. Cl.$^2$.......................................... A61K 7/16
[58] Field of Search ........................... 424/49–58

*Primary Examiner*—Richard L. Huff
*Attorney, Agent, or Firm*—Robert L. Stone; Herbert S. Sylvester; Murray M. Grill

[57] ABSTRACT

Visually clear dentifrices containing synthetic amorphous complex aluminosilicate salts are disclosed.

5 Claims, No Drawings

DENTIFRICES

This is a continuation of Application Ser. No. 182,142 filed Sept. 20, 1971, now abandoned.

This invention relates to dentifrices. In particular, it relates to dentifrices which are visually substantially clear.

Dentifrices which are visually clear, i.e. substantially transparent or translucent, are appealing to consumers. To be effective in cleaning the teeth, a polishing agent or abrasive ingredient such as calcium carbonate, dicalcium phosphate, tricalcium phosphate, calcium pyrophosphate and corresponding water insoluble magnesium salts has been included in dentifrices. An effect of such agents in conventional formulations is to render the dentifrices opaque.

It is an advantage of this invention that an effective polishing is provided while permitting the dentifrice to remain visually translucent or transparent, that is substantially clear. Other advantages will be apparent from consideration of the following specification.

According to the present invention, there is provided a visually substantially clear dentifrices comprising a dentally acceptable substantially water-insoluble particulate polishing agent in a gel vehicle having substantially the same refractive index as said polishing agent, said polishing agent being a synthetic amorphous complex aluminosilicate salt of an alkali metal or alkaline earth metal in which silica is interbonded with alumina and having a refractive index of about 1.44–1.47, up to about 20% by weight of moisture and up to about 10% by weight of alkali metal or alkaline earth metal oxide and said polishing agent being substantially invisible in said gel vehicle.

The dentifrice may be formulated as a clear gel. The complex aluminosilicate salt described above is typically alkaline in nature typically a sodium or calcium salt, and may effectively promote oral hygiene. It is an amorphous powder which further has the property that when incorporated in a gel or liquid vehicle the particles thereof become substantially invisible. Thus, a suitable particle size for the polishing agent is up to about 40 microns, preferably about 1–20 microns. The typical moisture content, measured by loss on ignition, is about 5–20% by weight of the agent and the typical content of alkali metal oxide, such as sodium oxide or alkaline earth metal oxide, such as calcium oxide, is up to about 10% by weight. Alumina is typically present in amount up to about 10% by weight and silica typically in amount of at least about 70% by weight: typically, the agent has a loose bulk density of up to about 0.2g/cc, preferably about 0.07–0.12g/cc.

The polishing agent typically comprises about 5–50% by weight of the dentifrice formulation, preferably about 10–30% by weight.

The complex aluminosilicate salt appears to contain interbonded silica and alumina having Al—O—Si bonds as described by Tamele, "Chemistry of the Surface and the Activity of Alumina-Silica Cracking Catalyst". Discussions of the Faraday Society, No. 8, Pages 270–279 (1950) and particularly at Page 273, FIG. 1, Curve 3 wherein the interaction between silica and aluminum ions is potentiometrically detected. Further literature describing this type of complex includes Milliken et al., "The Chemical Characteristics and Structure of Cracking Catalysts", Discussions of the Faraday Society, No. 8, Pages 279–290 (1950) and particularly the sentence bridging Pages 284–285. These complexes clearly differ from silica gel as is described by Plank et al., "Differences Between Silica and Silica-Alumina Gels I. Factors Affecting the Porous Structure of These Gels," Journal of Colloid Science, 2, Pages 399–412 (1947) and Plank, "Differences Between Silica and Silica-Alumina Gels II. A Proposed Mechanism for the Gelation and Syneresis of These Gels." Journal of Colloid Science 2, Pages 413–427, (1947) in which formation of the Al—O—Si bond is described at Pages 419–422.

The gel of liquid vehicle of the dentifrice preferably forms a mass of a consistency which desirably can be extruded from a collapsible tube such as an aluminum tube or a lead tube. The vehicle contains liquid and solids. In general, the liquid portion comprises water, glycerine, sorbitol and the like, including suitable mixtures thereof. It is usually advantageous to use a mixture of both water and a humectant such as glycerine, aqueous sorbitol or the like. The total liquid content is generally about 20–94.5% by weight of the visually clear dentifrice, and typically includes about 0–30% by weight of water, 0 – about 80% by weight of glycerine, and 0 to about 80% by weight of sorbitol. Preferably about 0–20% by weight of water, about 15–40% by weight of glycerine and 0 to about 50% by weight of sorbitol are present in the dentifrice.

In the liquid portion of the vehicle, sorbitol is suitably employed as a 70% by weight aqueous solution which has a refractive index of 1.45. Glycerine alone or admixed with the sorbitol solution does not substantially alter this desirable refractive index from that of the polishing agent, since glycerine has a refractive index of 1.47. Thus, an aqueous mixture of sorbitol and a substantial amount of glycerine is eminently satisfactory.

The solid portion of the vehicle is a gelling agent, such as the natural and synthetic gums and gum-like materials, such as Irish Moss, gum tragacanth, alkali metal carboxymethyl cellulose and hydroxyethyl carboxymethyl cellulose, polyvinyl pyrrolidone, starch, water soluble, hydrophilic colloidal carboxyvinyl polymers, such as those sold under the trademark Carbopol 934 and 940 and synthetic inorganic silicated clays such as those sold under the trademark Laponite CP and Laponite SP. These grades of Laponite have the formula $[Si_8Mg_{5.1}Li_{0.6}O_{24}]^{0.6-}$ $Na^+_{0.6}$. The solid portion of the vehicle is typically present in an amount up to about 10% by weight of the dentifrice and preferably about 0.5–5% by weight. When employed, grades of Laponite are preferably used in amounts of about 1–5% by weight.

Organic surface-active agents may be used in the compositions of the present invention to achieve increased prophylactic action, assist is achieving thorough and complete dispersion of the instant compositions throughout the oral cavity, and render the instant compositions more cosmetically acceptable. The organic surface-active material may be anionic, nonionic, ampholytic, or cationic in nature, and it is preferred to employ as the surface-active agent a detersive material which imparts to the composition detersive and foaming properties. Suitable types of such detergents are water-soluble salts of higher fatty acid monoglyceride monosulphates, such as the sodium salt of the monosulphated monoglyceride of hydrogenated coconut oil fatty acids, higher alkyl sulphates, such as sodium lauryl sulphate, alkyl aryl sulphonates, such as sodium dodecyl benzene sulphonate, olefin sulphonates, such as sodium olefin sulphonate in which the olefin group contains 12-21 carbon atoms, higher alkyl sulphoacetates, higher fatty acid ester of 1,2 dihydroxy propane sulphonates, and the substantially saturated higher aliphatic acyl amides of lower aliphatic amino carboxylic acid compounds, such as those having 12-16 carbons in the fatty acid, alkyl or acyl radicals, and the like. Examples of the last mentioned amaides are N-lauroyl sarcosine, and the sodium, potassium, and ethanolamine salts of N-lauroyl, N-myristoyl or N-palmitoyl sarcosine, which should be substantially free from soap or similar higher fatty acid material which tends to substantially reduce the effect of these compounds. The use of these sarcosine compounds in dentifrice compositions of the present invention is particularly advantageous since these materials exhibit a prolonged and marked effect in the inhibition of acid formation in the oral cavity due to carbohydrates breakdown in addition to exerting some reduction in the solubility of tooth enamel in acid solutions.

Other particularly suitable surface-active materials include nonionic agents such as condensates of sorbitan monostearate with approximately 60 moles of ethylene oxide, condensates of ethylene oxide with propylene oxide condensates of propylene glycol ("Pluronics") and amphoteric agents such as quaternized imidazole derivatives, which are available under the trademark "Miranol" such as Miranol $C_2M$. Cationic surface active germicides and antibacterial compounds such as di-isobutylphenoxyethoxyethyl dimethyl benzyl ammonium chloride, benzyl dimethyl stearyl ammonium chloride, tertiary amines having one fatty alkyl group (of from 12-18 carbon atoms) and two (poly) oxyethylene groups attached to the nitrogen (typically containing a total of from about 2 to 50 ethanoxy groups per molecule) and salts thereof with acids, and compounds of the structure.

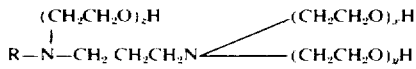

where R is a fatty alkyl group containing from about 12 to 18 carbon atoms, and $x$, $y$ and $z$ total 3 or higher, as well as salts thereof with mineral or organic acids, may also be used. It is preferred to use from about 0.05 to 5% by weight of the foregoing surface-active materials in the instant oral preparation.

Any suitable flavouring or sweetening materials may be employed in formulating a flavour for the compositions of the present invention. Examples of suitable flavouring constituents include the flavouring oils, e.g., oils of spearmint, peppermint, wintergreen, sassafras, clove, sage, eucalyptus, majoram, cinnamon, lemon and orange, as well as methylsalicylate. Suitable sweetening agents include sucrose, lactose, maltose, sorbitol, sodium cyclamate, perillartine and saccharine. Suitably, flavour and sweetening agents may together comprise from about 0.01 to 5% or more of the composition of the instant invention. Chloroform may also be used.

The compositions of the present invention may also contain a fluorine-containing compound having a beneficial effect on the care and hygiene of the oral cavity, e.g., diminution of enamel solubility in acid and protection of the teeth against decay which do not substantially detract from the clarity of the dentifrice. Examples thereof include sodium fluoride, potassium fluoride and complex fluorides, particularly sodium monofluorophosphate. These materials, which dissociate or release fluorine-containing ions, suitably may be present in an effective but non-toxic amount, usually within the range of about 0.01 to 1% by weight of the water-soluble fluorine content thereof. Sodium fluoride and sodium monofluorophosphate are particularly preferred, as well as mixtures thereof.

Various other materials may be incorporated in the oral preparations of this invention. Examples thereof are colouring or whitening agents or dyestuffs, preservatives, silicones, chlorophyll compounds, ammoniated materials such as urea, diammoniumphosphate and mixtures thereof, and other constituents. The adjuvants are incorporated in the instant compositions in amounts which do not substantially adversely affect the properties and characteristics desired and are selected and used in proper amounts depending upon the particular type of preparation involved.

Antibacterial agents may also be employed in the oral preparations of the instant invention in an amount of about 0.01-5% by weight. Typical antibacterial agents include $N^1$-(4-chlorobenzyl)-$N^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-$N^5$-p-chlorobenzylbiguanide;
1,6-di-p-chlorophenylbiguanidohexane;
1,6-bis(2-ethylhexylbiguanido) hexane;
1-(lauryldimethylammonium)-8-(p-chlorobenzyl-dimethylammonium) octane dichloride;
5,6-dichloro-2-guanidinobenzimidazole;
$N^1$-p-chlorophenyl-$N^5$-laurylbiguanide;
5-amino-1,3-bis(2-ethylhexyl)-5-methylhexahydro pyrimidine;
and their non-toxic acid addition salts.

Additional water-insoluble dental polishing agents may be used as part of the polishing agent with the aluminosilicate compound, to modify the polishing character, if desired. They are used in amount such that the total polishing agent may be up to about 60% by weight of the dentifrice preparation. These additional polishing agents include dicalcium phosphate, tricalcium phosphate, insoluble sodium metaphosphate, aluminum hydroxide, magnesium carbonate, calcium carbonate, calcium pyrophosphate, calcium sulfate, polymethyl methacrylate, bentonite, etc., including suitable mixtures thereof.

These additional polishing agents, when included substantially clear dentifrices should be present in small amounts, such as up to about 10% by weight of the dentifrice, typically up to about 10% by weight of the total polishing agent, since they tend to decrease transparency.

Synthetic finely divided silicas such as those sold under the Trade Marks Cab—O—Sil M-5, Syloid 244, Syloid 266, Aerosil D200 and mixtures thereof, may also be employed in amounts of about 0.5-20% by weight to promote thickening or gelling and to improve clarity of the dentifrice.

In the manufacture of dentifrices, it is conventional to remove entrained air from the product by de-aeration under vacuum typically at a late stage in the manufacture. In an aspect of the instant invention, it has been observed that in clear dentifrice gels of suitable viscosity, the dispersed, immobile air bubbles desirably enhance the appearance of the dentifrice, and can, therefore, be permitted to remain. Furthermore, air can be at least partially removed and reintroduced as substantially globular or spheroidal bubbles of say about 0.1 – 8mm, preferably about 0.5–5mm in size, well distributed in the gel at an average of at least about one per cubic centimeter. Such air bubbles may be placed in the gel by stirring it while introducing air. Instead of air, bubbles of another gas, such as nitrogen or carbon dioxide, can be introduced in non-toxic quantity. In particular, carbon dioxide can provide an effervescent character to the dentifrice.

In the event it is desired to have a minimum amount of air in the dentifrice, or only to have to remove a minimum amount of air from the dentifrice of the instant invention, the "Unimix" apparatus described in "Process Engineering" Sept. 11, 1970, pages 81–85, is particularly efficacious for this purpose. In this apparatus a mixing tool can be rotated in clockwise or counterclockwise manner, and the action of the mixing tool is followed by the action of a scraper blade to ensure that the working surface of the apparatus is scraped clean. Preferably, a plastic such as polytetrafluorethylene is used as the scraper since it is compatible with the various ingredients of the dentifrice. The positioning of the mixing tool and the scraper from a raised central column in the apparatus and the further presence of a hydraulically operated vacuum tight lid permits but little air to enter the formulation during processing. Thus, gelling agent and a portion of liquid including water and/or humectant can be efficiently blended in the Unimix apparatus. Then the remaining liquid can be separately blended with the polishing agent and additional components (except for post-added componets, such as flavouring oil) in the Unimix, and then the two dispersions blended together in the Unimix apparatus. If desired, the small amount of air can be largely removed under the depressurized conditions in the apparatus. The apparatus can be used to blend ingredients at room temperature as well as at higher temperatures.

Furthermore, if desired, visible particles of dyes, pearlescent flakes or particles of insoluble salts of antibacterial agents such as the monofluorophosphate salt or the disarcosinate salt of 1.6-di-p-Chlorophenyl-biguanidoxhexane, as well as other particles, can be distributed in the dentifrice.

The dentifrices should have a pH practicable for use. A moderately alkaline pH is preferred.

The following specific examples are further illustrative of the nature of the present invention, although it is understood that the invention is not limited thereto. All amounts are by weight unless otherwise indicated.

EXAMPLE 1

The following visually substantially clear dentifrice gel is prepared and entrained air is removed under vacuum:

| Component | Parts |
|---|---|
| Sorbitol (70% solution) | 50 |
| Glycerine | 25 |
| Sodium Aluminosilicate | 20 |
| Sodium N-Lauroyl Sarcosinate | 2.0 |
| Flavour | 2.0 |
| Sodium Carboxymethyl Cellulose | 0.5 |
| Sodium Saccharin | 0.1 |
| Formalin Preservative | 0.1 |
| Water and Colouring Matter | 0.3 |

The sodium aluminosilicate employed is a complex having a refractive index of 1.45, a moisture content of 10%, an alumina content of 8.0%, a silica content of above 70%, a sodium oxide content of 7%, a particle size such that 98% of the particles are less than 30 microns and a loose bulk density of 0.114 g/cc.

EXAMPLE 2

The following visually substantially clear dentifrice gel is prepared and entrained air is removed under vacuum:

| Component | Parts |
|---|---|
| Glycerine | 25 |
| Sorbitol (70%) | 47 |
| Sodium Aluminosilicate | 16 |
| Aerosil D 200 | 3 |
| Sodium N-Lauroyl sarcosinate | 2 |
| Laponite SP | 2 |
| Flavour and Sweetener | 1.2 |
| Colour | 1 |
| Water | 2.8 |

The sodium aluminosilicate employed is a complex having a refractive index of 1.46, a moisture content of about 6%, an alumina content of 8.2%, a silica content of 72%, a sodium oxide content of 7%, and average particle size of about 35 microns and a sieved loose bulk density of about 0.07 g/cc.

In the instant example, the deacration air may be reintroduced as homogeneously distributed bubbles by contacting air with the gel while stirring. Such bubbles average about 0.5–5mm in size. This gel is esthatically pleasing.

EXAMPLE 3

The following visually substantially clear dentifrice gel is prepared and entrained air is removed under vacuum:

| Component | Parts |
|---|---|
| Sorbitol (70%) | 70 |
| Sodium aluminosilicate | 20 |
| Laponite CP | 2 |
| Sodium N-lauroyl sarcosinate | 2 |
| 1,6-di(p-chlorophenyl biguanidoa-hexane) | 0.619 |
| Flavour and sweetener | 1.2 |
| Colour | 1 |
| Water | 3.181 |

The sodium aluminosilicate employed is the complex employed in Example 1.

EXAMPLE 4

The following visually substantially clear dentifrice gel is prepared and entrained air is removed under vacuum:

| Components | Parts |
| --- | --- |
| Glycerine | 35 |
| Sorbitol (70%) | 38 |
| Laponite SP | 2 |
| Sodium Aluminosilicate | 10 |
| Sodium N-lauroyl sarcosinate | 2 |
| Flavour and sweetener | 1.1 |
| Colour | 1 |
| Sodium monofluorophosphate | 0.76 |
| Water | 10.14 |

The sodium aluminosilicate employed is a complex having a refractive index of 1.47, a moisture content of less than 10%, an alumina content of 8.0%, a silica content of 78%, and a sodium oxide content of 10%.

EXAMPLE 5

The following visually substantially clear gel containing dispersed visually apparent particles of 1,6-di-(p-chlorophenyl biguanidohexane) monofluorophate is prepared and deareated:

| Components | Parts |
| --- | --- |
| Sorbitol (70%) | 47 |
| Glycerine | 25 |
| Laponite SP | 2 |
| Syloid 244 | 4 |
| Sodium aluminosilicate | 16 |
| 1,6-di-(p-chlorophenyl biguanido)hexane monofluorophosphate | 0.55 |
| Sodium N-lauroyl sarcosinate | 2 |
| Flavour and sweetener | 1.1 |
| Colour | 1.1 |
| Water | 1.25 |

The sodium aluminosilicate employed is the complex employed in Example 2.

EXAMPLE 6

The following visually substantially clear translucent gel is prepared and deareated:

| Components | Parts |
| --- | --- |
| Glycerine | 25 |
| Sorbitol (70%) | 45 |
| Sodium carboxymethylcellulose | 0.7 |
| Syloid 244 | 5 |
| Sodium aluminosilicate | 16 |
| Sodium Lauryl Sulphate | 2 |
| Sodium Benzoate | 0.5 |
| Sodium Saccharine | 0.2 |
| Colour | 0.2 |
| Flavour and Chloroform | 3.5 |
| Water | 3 |

The sodium aluminosilicate employed is the complex employed in Example 2.

EXAMPLE 7

A substantially visually clear gel is also prepared when calcium aluminosilicate complex having similar refractive index and particle size, an alumina content of 2.85%, a silica content of above 70%, a calcium oxide content of below 10%, replaces the sodium aluminosilicate described in Example 2 in the formulation of Example 6.

Other alkali metal and alkaline earth metal aluminosilicate non-toxic polishing agents which may be employed include the lithium, potassium, ammonium and magnesium salts.

It will be apparent to one skilled in the art that various modifications of the above examples may be made thereto.

I claim:

1. A visually substantially clear dentifrice comprising about 5–50% by weight of a dentally acceptable substantially water-insoluble particulate polishing agent in a gel vehicle having substantially the same refractive index as said polishing agent, said polishing agent being a synthetic, amorphous complex aluminosilicate salt of an alkali metal of alkaline earth metal in which silica is interbonded with alumina and having a refractive index of about 1.44–1.47, up to about 20% by weight of moisture and up to about 10% by weight of alkali metal oxide or alkaline earth metal oxide and said polishing agent being substantially invisible in said liquid vehicle.

2. The dentifrice claimed in claim 1 wherein said gel vehicle comprises a liquid containing water, a humectant or mixtures thereof and comprising about 20–94.5% by weight of the dentifrice and a gelling agent comprising about 0.5–5% by weight of the dentifrice.

3. The dentifrice claimed in claim 2 wherein said liquid comprises up to 30% by weight of water, about 15–40% by weight of glycerine humectant and up to about 80% by weight of sorbitol humectant.

4. The dentifrice claimed in claim 1 wherein said complex aluminosilicate salt is a sodium salt.

5. The dentifrice claimed in claim 1 wherein said complex aluminosilicate salt is a calcium salt.

* * * * *